US008400533B1

(12) United States Patent
Szedo et al.

(10) Patent No.: US 8,400,533 B1
(45) Date of Patent: Mar. 19, 2013

(54) METHODS OF REDUCING ABERRATIONS IN A DIGITAL IMAGE

(75) Inventors: Gabor Szedo, Longmont, CO (US); Jose R. Alvarez, Sunnyvale, CA (US)

(73) Assignee: Xilinx, Inc., San Jose, CA (US)

(*) Notice: Subject to any disclaimer, the term of this patent is extended or adjusted under 35 U.S.C. 154(b) by 289 days.

(21) Appl. No.: 12/710,866

(22) Filed: Feb. 23, 2010

(51) Int. Cl.
| | |
|---|---|
| H04N 5/217 | (2006.01) |
| H04N 9/64 | (2006.01) |
| H04N 9/68 | (2006.01) |
| H04N 5/228 | (2006.01) |

(52) U.S. Cl. ............ 348/241; 348/246; 348/222.1; 348/234

(58) Field of Classification Search ............ 348/241, 348/280, 699, 225.1, 222.1, 234; 382/190, 382/192–195, 199, 300
See application file for complete search history.

(56) References Cited

U.S. PATENT DOCUMENTS

| | | | | |
|---|---|---|---|---|
| 2008/0259180 | A1* | 10/2008 | Ovsiannikov | 348/225.1 |
| 2009/0034878 | A1* | 2/2009 | Sakamoto | 382/300 |
| 2010/0110302 | A1* | 5/2010 | Yokoyama | 348/699 |

OTHER PUBLICATIONS

U.S. Appl. No. 12/622,327, filed Nov. 19, 2009, Szedo.
Chen, Tsung-Huang et al., "Cost Effective Color Filter Array Demosaicking with Chrominance Variance Weighted Interpolation," *IEEE International Symposium on Circuits and Systems (ISCAS 2007)* May 27, 2007, pp. 1277-1280, IEEE, Piscataway, New Jersey, USA.
Gunturk, Bahadir K. et al., "Demosaicking: Color Filter Array Interpolation," *IEEE Signal Processing Magazine*, Jan. 2005, pp. 44-54, vol. 44, No. 1, IEEE Signal Processing Society, Piscataway, New Jersey, USA.
Hirakawa, Keigo et al., "Adaptive Homogeneity-Directed Demosaicing Algorithm" *IEEE Transactions on Image Processing*, Mar. 2005, pp. 360-369, IEEE, Piscataway, New Jersey, USA.

* cited by examiner

*Primary Examiner* — Roberto Velez
*Assistant Examiner* — Stephen Coleman
(74) *Attorney, Agent, or Firm* — John J. King; Lois D. Cartier

(57) ABSTRACT

A method of reducing aberrations in a digital image comprises capturing input samples associated with a plurality of pixels arranged in a matrix, wherein each pixel is associated with a color defining the digital image; establishing vertical chrominance groups associated with columns of the matrix and horizontal chrominance groups associated with rows of the matrix; determining chrominance values for the chrominance groups; determining, for each chrominance group, a mean value and, a sum of absolute differences between the chrominance values and the mean value for the chrominance values of the chrominance group; calculating, by a signal processing device, a plurality of weights comprising vertical weights associated with the vertical chrominance groups and horizontal weights associated with the horizontal chrominance groups based upon the sums of absolute differences; and determining a missing color component for a predetermined pixel of the plurality of pixels using the plurality of weights.

14 Claims, 8 Drawing Sheets

Group 1
{$K_1$, $K_3$, $K_5$, $K_7$}

Group 2
{$K_2$, $K_4$, $K_{10}$, $K_{12}$}

Group 3
{$K_4$, $K_6$, $K_8$, $K_{10}$}

Group 4
{$K_1$, $K_7$, $K_9$, $K_{11}$}

FIG. 3

METHODS OF REDUCING ABERRATIONS IN A DIGITAL IMAGE

FIELD OF THE INVENTION

The present invention relates generally to electronic circuits, and in particular, to methods of reducing aberrations in a digital image.

BACKGROUND

Receptors in the human eye are only capable of detecting light having wavelengths between approximately 400 nanometers (nm) and 700 nm. These receptors are of three different types, including receptors for red (R) light, receptors for green (G) light, and receptors for blue (B) light. The representation of an image based upon the intensity of red, blue, and green color components is commonly referred to as RGB. If a single wavelength of light is observed, the relative responses of these three types of receptors allow us to discern what is commonly referred to as the color of the light. This phenomenon is extremely useful in color video processing, because it enables generating a range of colors by adding together various proportions of light from just three wavelengths.

An image to be displayed is broken down into an array of picture elements or pixels to be displayed. Generally, each pixel displays a proportion of red, green, and blue light depending on the signals driven to be displayed. Many image detecting devices include a sensor that will detect only one color component for each pixel. However, when rendering a color image, the two missing color components at each pixel have to be interpolated based upon color components of other pixels. If this process is not performed appropriately, the produced image quality will be degraded by various aberrations, such as highly visible zipper effects and false color artifacts. A zipper effect refers to abrupt and unnatural changes in intensity between neighboring pixels. False color artifacts correspond to streaks of colors that do not exist in the original image.

SUMMARY

A method of reducing aberrations in a digital image is disclosed. The method comprises capturing input samples associated with a plurality of pixels arranged in a matrix, where each pixel is associated with a color component of a plurality of color components defining the digital image; establishing vertical chrominance groups associated with columns of the matrix and horizontal chrominance groups associated with rows of the matrix; determining, for each of the vertical and horizontal chrominance groups, chrominance values associated with the chrominance group; determining, for each of the vertical and horizontal chrominance groups, a mean value for the chrominance values associated with the chrominance group; determining, for each of the vertical and horizontal chrominance groups, a sum of absolute differences between the chrominance values and the mean value for the chrominance values associated with the chrominance group; calculating, by a signal processing device, a plurality of weights comprising vertical weights associated with the vertical chrominance groups and horizontal weights associated with the horizontal chrominance groups based upon the sums of absolute differences; and determining a missing color component for a predetermined pixel of the plurality of pixels using the plurality of weights.

According to other aspects of the method, capturing input samples may comprise capturing input samples having every other pixel of each row of the matrix represented by a first color component, such as a green or yellow color component, wherein establishing vertical and horizontal chrominance groups may comprise determining a magnitude difference of intensity values between a pixel represented by the first color component and a pixel represented by a second color component, such as a blue or cyan color component, or between a pixel represented by the first color component and a pixel represented by a third color component, such as a red or magenta color component. Further, determining missing color components for a predetermined pixel may comprise determining a first color component, wherein the method may further comprise determining a missing second color component or a missing third color component for each pixel of the plurality of pixels. The method may further comprise generating the digital image having a first, second, and third color component for each pixel of the plurality of pixels, and correcting a horizontal zipper effect associated with the digital image. The method may further comprise calculating spatial differences for each of the vertical and horizontal chrominance groups, wherein the plurality of weights are calculated based upon spatial differences. Calculating the plurality of weights may further comprise increasing the vertical weights with respect to the horizontal weights.

According to an alternate embodiment, a method of reducing aberrations in a digital image comprises capturing input samples associated with a plurality of pixels arranged in a matrix, wherein each pixel is associated with a color component of a plurality of color components defining the digital image; establishing vertical chrominance groups associated with columns of the matrix and horizontal chrominance groups associated with rows of the matrix; calculating, by a signal processing device, a plurality of weights comprising vertical weights associated with the vertical chrominance groups and horizontal weights associated with the horizontal chrominance groups; increasing the vertical weights; and determining a missing color component for predetermined a pixel of the plurality of pixels using the horizontal weights and the increased vertical weights.

According to the alternate embodiment, increasing the vertical weights may comprise multiplying each weight of the vertical weights by a predetermined factor. The method may further comprise determining, for each of the vertical and horizontal chrominance groups, a sum of absolute differences between the chrominance values and the mean value for the chrominance values of the chrominance group, wherein calculating a plurality of weights comprises calculating a plurality of weights based upon the sums of absolute differences. The method may further comprise determining, for each of the vertical and horizontal chrominance groups, spatial differences, wherein calculating a plurality of weights comprises calculating a plurality of weights based upon the spatial differences. Capturing input samples may comprise capturing a matrix of input samples having every other pixel of the matrix represented by a first color component, wherein establishing chrominance groups may comprise determining a magnitude difference of intensity values between a pixel represented by the first color component and a pixel represented by a second color component or between a pixel represented by the first color component and a pixel represented by a third color component. Further, determining a missing color component for a predetermined pixel may comprise determining a first color component. The method may further comprise determining a missing first component for each pixel of the plurality of pixels not having the first color component, determining a second color component for each pixel of the plurality of pixels not having the second color component and determining a third color component for each pixel of the plurality of pixels not having the third color component. The method may further comprise generating the digital image comprising a first color component, a second color component and a third color component for each pixel of the digital image, and then correcting horizontal zipper effects associated with the digital image.

According to a further embodiment, a method of reducing aberrations in a digital image comprises determining missing color components in a plurality of pixels arranged in a matrix to establish a multi-color representation of the plurality of pixels in the matrix; converting the multi-color representation of the plurality of pixels to a chrominance-luminance representation of the plurality of pixels; identifying portions of the plurality of pixels to be filtered based upon luminance values of the chrominance-luminance representation of the plurality of pixels; filtering, by a signal processing device, the identified portions of the plurality of pixels; and generating the digital image comprising the identified portions of the plurality of pixels which are filtered.

Identifying portions of the plurality of pixels to be filtered may comprise determining the presence of a Nyquist frequency. The method may further comprise passing remaining portions of the plurality of pixels which are not identified as the portions of the plurality of pixels to be filtered. Generating the digital image may comprise merging the identified portions of the plurality of pixels which are filtered with remaining portions of the plurality of pixels. Identifying portions of the plurality of pixels to be filtered may comprise analyzing rows of data of the digital image and wherein filtering the identified portions of the plurality of pixels comprises correcting horizontal zipper effects in the rows of data.

BRIEF DESCRIPTION OF THE DRAWINGS

FIG. 3 is a diagram showing chrominance groups processed by the system of FIG. 1 according to an embodiment of the present invention;

DETAILED DESCRIPTION

Figure 1:
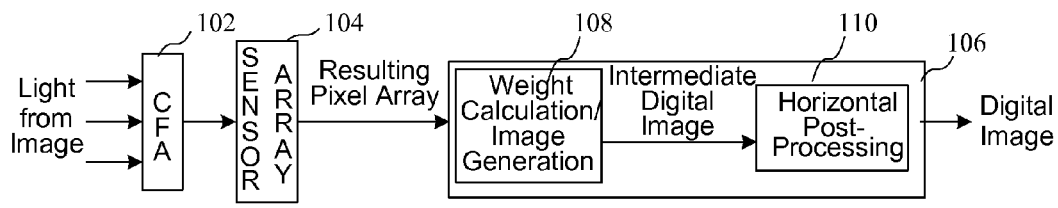
FIG. 1 is a block diagram of a system for reducing aberrations in a digital image according to an embodiment of the present invention.

Turning first to FIG. 1, a block diagram of a system for reducing aberrations in a digital image according to an embodiment of the present invention is shown. In particular, the system of FIG. 1 comprises a color filter array (CFA) 102 coupled to receive light from a scene for which a digital image is to be generated. Common color filter arrays are typically comprised of red, green, blue, or cyan, magenta, yellow, or cyan, magenta, yellow, green color filters. It should be noted that, while various embodiments described below relate to red, green, blue color filter arrays, the embodiments may also apply to other color filter arrays, such as cyan, magenta, yellow. It should also be noted that while a three color array is described, the circuit and methods may also be applied to a four color filter array, as will be described in more detail below. An output of the color filter array 102 is provided to a sensor array 104. The sensor array 104 comprises a sensor in each block representing a pixel of a matrix to generate a resulting pixel array, as will be described in more detail in reference to FIG. 2. Common image sensors which may be implemented in the sensor array include a charge coupled device (CCD) or a complementary metal oxide semiconductor (CMOS) device.

The resulting pixel array is coupled to a processing device 106 which comprises a weight calculation/image generation block 108 and a horizontal post-processing block 110. Weight calculations performed by the weight calculation/image generation block 108 and horizontal post-processing performed by the horizontal post-processing block 110 will be described in more detail in reference to the remaining figures. The processing device 106 may be any type of signal processing device for processing data, where the signal processing device may be implemented in a computer, for example. Further, the processing device may be implemented in a single integrated circuit device, or a plurality of integrated circuit devices. One type of integrated circuit device which may be used to implement the methods of reducing aberrations in a digital image may be a device having programmable resources, such as the device described in more detail in reference to FIGS. 8 and 9.

Figure 2:
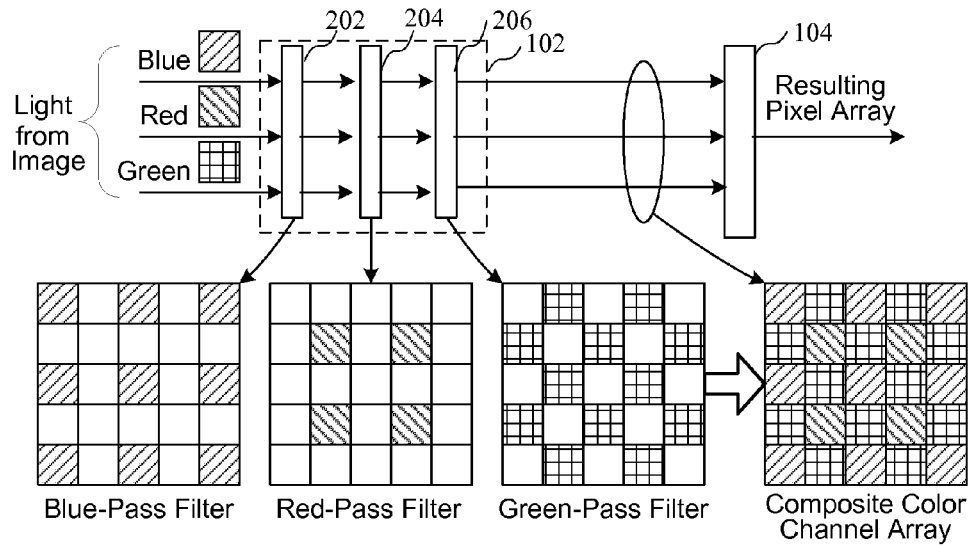
FIG. 2 is a diagram showing the generation of a pixel array according to an embodiment of the present invention.
Figure 4:
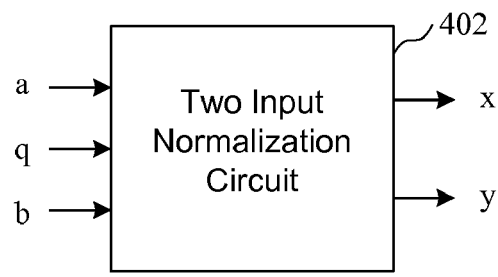
FIG. 4 is a block diagram of a circuit for providing two-input normalization according to an embodiment of the present invention.

Many digital imaging devices, such digital still cameras, acquire imagery using an image sensor overlaid with a color filter array, such that each sensor pixel of the image sensor samples only one of the three primary colors red, green and blue, or cyan, magenta, yellow and optionally green. As shown in FIG. 2, the color filter array 102 may comprise a plurality of filters 202-206 for creating a composite color channel array detected by the 2-dimensional sensor array 104. According to the example of FIG. 2, a first filter 202 comprises a blue-pass filter. That is, only frequencies of light corresponding to the color blue will be passed in the boxes designated by a forward slash pattern. The other boxes (shown with no pattern) will pass all of the frequencies of light from the image which are incident at the location of the other boxes. Similarly, a second filter 204 comprises a red-pass filter which will only enable frequencies of light corresponding to the color red to pass in the boxes designated by a backward slash pattern. Finally, a third filter 206 having a green-pass filter will only enable the frequencies of light corresponding to the color green to pass in the boxes designated by a cross-hatch pattern. The light from an image is sampled and the composite of the filters 202-206 provides color channels representing intensity values to achieve the composite color channel array as is shown in FIG. 2. That is, the composite of the three filters 202-206 will allow only one color to pass in each box of the matrix. Accordingly, the resulting pixel array, also commonly referred to as a CFA sub-sampled image, detected by the sensor array 104 comprises a matrix associated with the image, where each pixel of the matrix is represented only by a single color component. The particular arrangement of color components as shown in FIG. 2 is the commonly referred to as a Bayer CFA pattern.

As will be described in more detail below, the intensity values of the two missing color component at each pixel must be interpolated from known intensity values in neighboring pixels to render a complete multi-color image from the resulting pixel array. This process, commonly referred to as demosaicking, is one of the critical tasks in digital image processing. If demosaicking is not performed appropriately, the produced image quality will be degraded by highly visible zipper effects and false color artifacts. While false color artifacts may appear anywhere on an image, zipper effects may appear in either a vertical orientation or a horizontal orientation. Both aberrations are due to aliasing, the fact that sample positions of sub-sampled color channels are offset spatially, and high contrast edges lying between the sampling positions that may affect color components used in the interpolation process differently.

While the explanation of various embodiments of the invention set forth below relates to the primary colors red, green and blue, it should be understood that circuits and methods of the invention could extend to any other groups of colors associated with a multi-color representation of a pixel. For example, the circuits and methods could be employed with cyan, magenta, and yellow which are used in a multi-color representation of the digital image. While a 5×5 matrix is preferably used to calculate weights and interpolate values for missing color components in a given pixel, it should be understood that methods may be adapted to be performed on a larger matrix than a 5×5 matrix, and the overall image comprises many more pixels than the 5×5 array of pixels. While references are made to single images which are generated, it should be understood that the light from an image may be sampled at a given frequency, where the sampled data may be processed to generate video data.

As the human eye is at least twice as sensitive to green light than to blue or red light, the green color channel is sampled with twice the frequency of the blue and red color channels. In the Bayer CFA pattern shown in FIG. 2, green samples are located on a quincunx lattice, while red and blue samples are obtained on rectangular lattices. That is, the green samples are obtained in every other pixel in each row and column, where the rows and columns are staggered to form a checker-based pattern. The red and blue samples are obtained in every other pixel (not having a green sample) in every other row and column, with the red and blue color components in alternating rows and columns. Therefore, the interpolation of the green color component for a given pixel which does not have a green color component usually differs from the interpolation of red and blue color components.

The purpose of interpolation is to find missing color components for a given pixel. Numerous techniques have been developed for CFA interpolation. These techniques offer a wide range of tradeoffs between the complexity and the quality of results. The complexity is often measured as instructions per pixel or some function of silicon real estate, such as gate counts. The quality of results is predominantly measured as a Signal-to-Noise Ratio (SNR) or a Peak Signal-to-Noise Ratio. However, conventional methods either lead to significant aberrations in the digital image or require significant processing capacity to perform the interpolation. This significant processing capacity required may limit the devices in which the methods may be implemented or increase the cost of implementing the methods.

Figure 3:
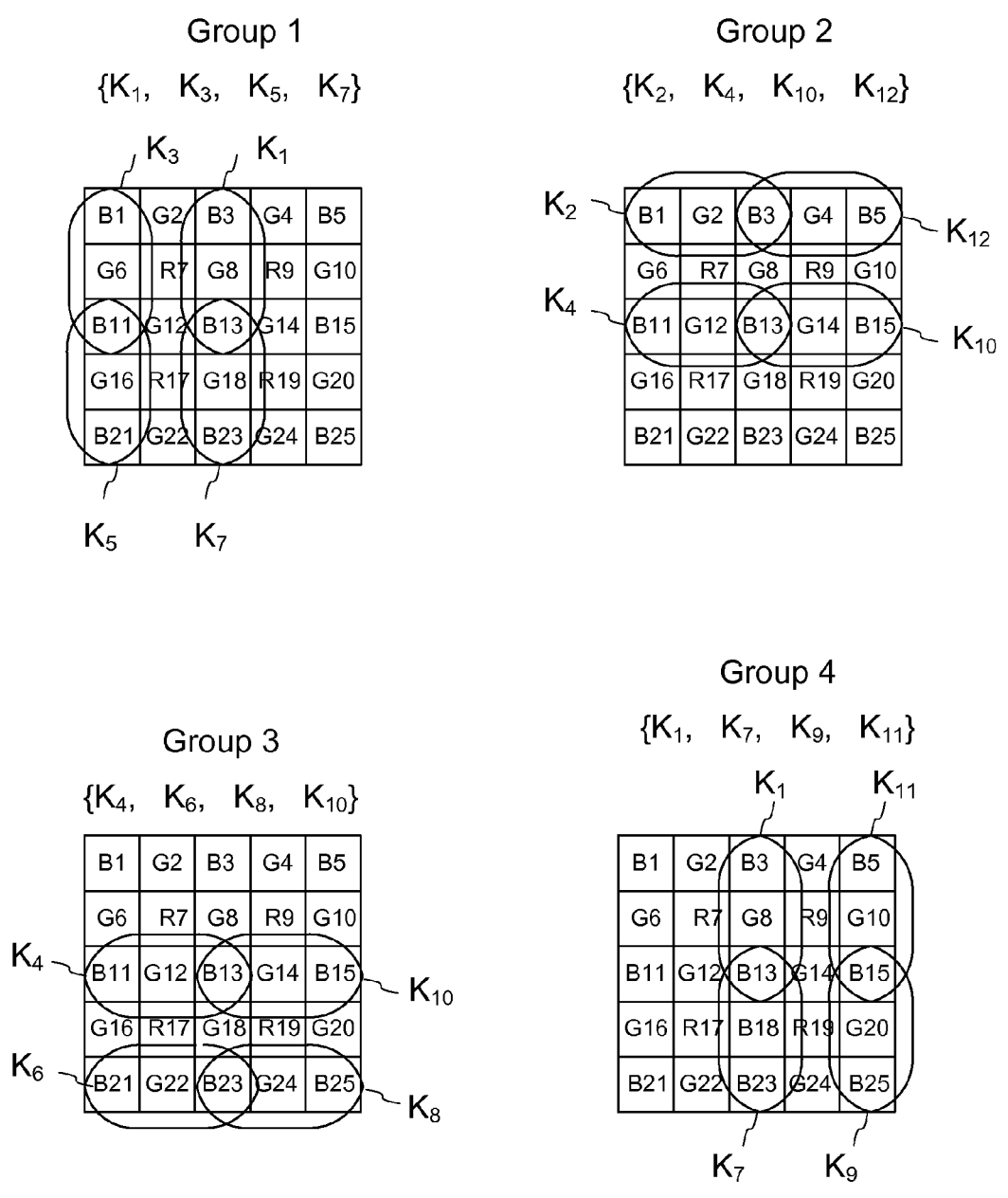

Preferably, the green color component in pixels lacking intensity values for green color components are interpolated first. In order to interpolate the green color component, four chrominance groups are established as shown in FIG. 3, where the blocks of the 5×5 matrix are numbered from 1-25 and have a letter prefix according to the color component which is known for that block. A chrominance value is calculated as a difference between a green intensity value and the blue or red intensity values for a certain group of pixels. For example, a chrominance value $K_1$ is calculated such that $K_1 = G8 - 0.5(B3 + B13)$. That is, the chrominance value is generated based upon a center green value and two adjacent red or blue values of three consecutive pixels, where the red or blue values may be either horizontally adjacent or vertically adjacent with respect to a given green value. Mean values ($m_n$), sums of absolute differences ($SAD_n$), and spatial differences ($SD_n$) are then calculated for the four chrominance groups (n=1, 2, 3, 4) shown in FIG. 3. That is, each chrominance group comprises 4 chrominance values, and a mean value of the 4 chrominance values is determined. The sums of absolute differences are calculated using the determined mean values according to Equation (1):

$$SAD_n = \sum_{i=1}^{4} |K_{G_i,n} - m_{G_n}|. \tag{1}$$

The spatial differences $SD_n$ are then calculated as set forth in Equation (2):

$$SD_n = \begin{cases} |B_3 - B_{13}| + |B_{13} - B_{23}| & n = 1, 4 \\ |B_{11} - B_{13}| + |B_{13} - B_{15}| & m = 2, 3 \end{cases} \tag{2}$$

Weights for each of the 4 groups are then calculated as shown in Equation (3):

$$w_n = \frac{1}{\varepsilon + SAD_n + SD_n}, \text{ for } n = 1, 2, 3, 4, \text{ where } \varepsilon = 1 \tag{3}$$

Calculating weights based upon the sum of absolute differences rather than a variance, for example, will reduce the arithmetic requirements. That is, because the determination of a variance requires a square root calculation, the calculation of weights based upon a variance calculation requires significant arithmetic operations. Any reduction in arithmetic operations will not only reduce the processing time, but also the hardware necessary to calculate the weights.

As can be seen in FIG. 3 and Equation (3), the calculated weights comprise vertical weights associated with vertical chrominance groups and horizontal weights associated with horizontal chrominance groups. The correction of aberrations in a vertical orientation is more difficult than the correction of aberrations in the horizontal orientation. That is, because the data for the image is evaluated on a row-by-row basis, corrections involving horizontal data do not require memory buffers and can be performed while the data is loaded. As will be described in more detail below, horizontal post-processing may be easily performed after a complete digital image having three color components for each pixel is generated. Therefore, according to one embodiment of the invention, the calculation of weights is tuned to increase the vertical weights. That is, the vertical weights are increased with respect to the horizontal weights to provide additional correction for aberrations which may appear in columns of pixels (i.e. a vertical orientation) which would not be corrected by horizontal post-processing. For example, the weights corresponding to vertically-oriented chrominance groups (i.e. $w_1$ and $w_4$ corresponding to Chrominance Groups 1 and 4 of FIG. 3) may be multiplied by 2.

Normalized weights are then defined as shown in Equation (4):

$$\overline{w}_n = \frac{w_n}{\sum_{k=1}^{4} w_k}, \tag{4}$$

where k is a chrominance group. However, the weight normalization step in Equation (4) requires the use of a wide divider, which requires a significant amount of hardware to implement. Instead of using a divider and 4 multipliers to calculate the normalized weights as would be required by the Equation (4), a weight distribution network may be used according to one embodiment of the invention. Various processing techniques for processing video and other data use the weighed sum operation as set forth in Equation (5):

$$s = \sum_N w_i x_i; \tag{5}$$

where "$w_i$" are the weights with which "$x_i$" are qualified and the sum of the weights is equal to one. However, if the sum of the weights is not equal to one, normalized weights $$\overline{w}_i = \frac{w_i}{s_w}$$

should be used instead of $w_i$ in Equation (5).

However, the calculation of N normalized weights requires N division operations. In hardware applications, such a calculation of normalized weights may be prohibitively costly. Assuming that the number of weights $N=2^n$ where n is a positive integer, a method of normalizing weights enables normalizing weights by iterative sub-division, without division, according to one embodiment of the present invention. Before providing a more general framework for the weight normalization technique according to the present invention, the case where only two weights have to be normalized (i.e. N=2, n=1) will be considered first. "a" and "b" denote the weights to be normalized, "x" and "y" denote the corresponding normalized values, and "q" is the expected sum of "x" and "y" such that:

$$\frac{x}{y} = \frac{a}{b}, \text{ and } x + y = q, \tag{6}$$

where "q" shall be set to "1" for the normalization of two weights.

Figure 5:
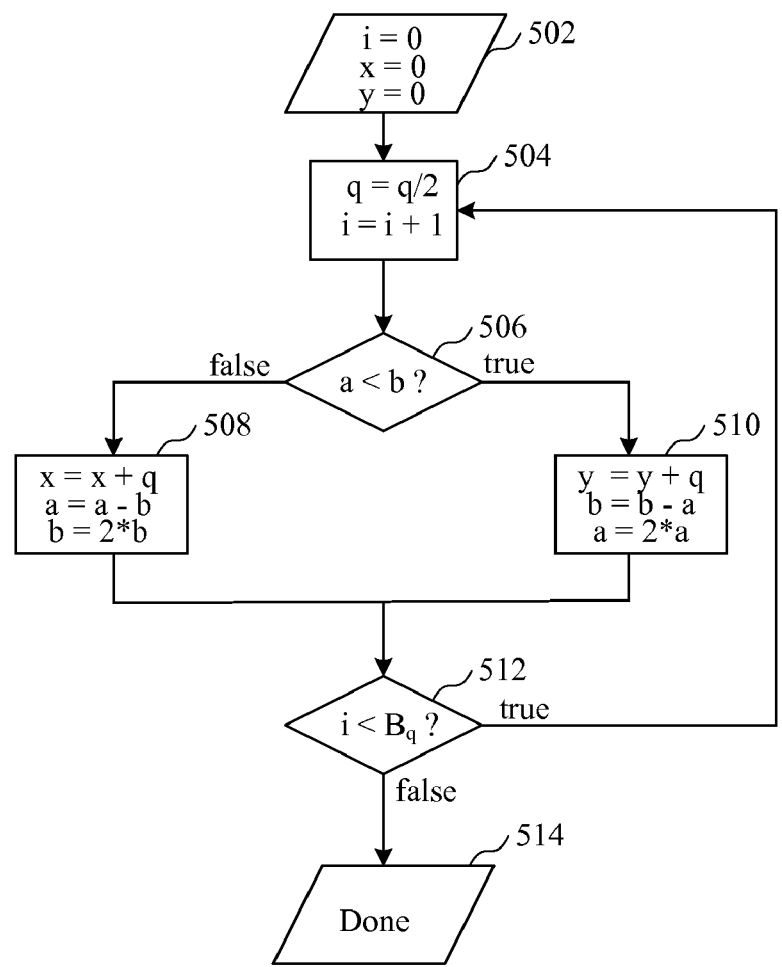
FIG. 5 is a flowchart showing the operation of the circuit of FIG. 4 for providing two-input normalization according to an embodiment of the present invention.
Figure 6:
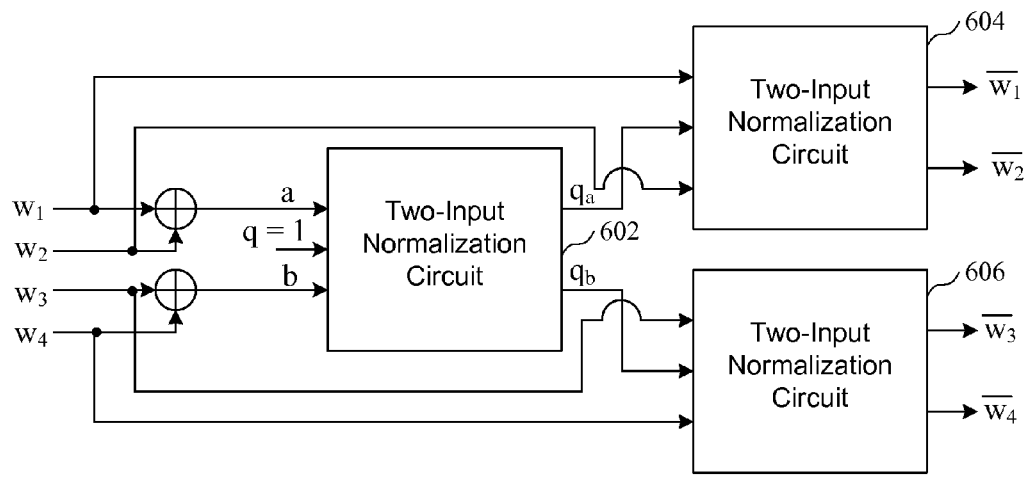
FIG. 6 is a block diagram of a cascading circuit for providing normalization according to an embodiment of the present invention.

The normalized weights for weights "x" and "y" are then calculated in an iterative fashion, with each step refining the results with another binary digit. In particular, "i," "x" and "y" are initialized to a value of "0" at a step 502. The value of "q" is set equal to "q/2" and "i" is incremented to "i+1" at a step 504. It is then determined whether a<b at a step 506. If so, the values of "x," "y," "a," and "b" are modified such that "x=x+q," "a=a−b," and "b=b*2." If not, the values are modified such that "y=y+q," "b=b−a," and "a=2*a." It is then determined whether i<$B_q$, where "$B_q$" denotes the number of bits used to represent "q," at a step 512. If so, the process returns to step 504. Otherwise, the process is finished. In a digital system where "q" is represented as a binary integer, the process converges in "$B_q$" cycles The method of normalizing weights may be extended to a number of weights being some other multiple of 2. In particular, the block diagram of FIG. 6 shows a cascading circuit for providing normalization for N=4. Cascading the normalization blocks of FIG. 5 allows the implementation of the normalization of weights in cases where $N=2^n$ and $N \geq 2$. The first step of normalization for $N=2^n$ takes place by splitting the weights into two groups of $N=2^{n-1}$ elements, and combining the weights in the two groups. The combined weights are inputs "a" and "b" to weight normalization circuit 602, which will divide the expected sum, "q", into "$q_a$" and "$q_b$." Two-input normalizers 604 and 606 in the second stage will further subdivide "$q_a$" and "$q_b$" according to weights provided to the respective inputs "a" and "b." Accordingly, the cascaded two-input normalization circuit can be extended to normalize weights for any number of $N=2^n$.

Because division by two in hardware can be implemented at no cost, the method for weight normalization set forth above can be mapped easily to either parallel or serial hardware implementations using only comparators, multiplexers and adders/subtractors. Additional details for implementing weight normalization according to the present invention may be found in co-pending application Ser. No. 12/622,327, entitled (WEIGHT NORMALIZATION IN HARDWARE WITHOUT A DIVISION) and filed on Nov. 19, 2009 by the assignee of the present invention, the entire application of which is incorporated herein by reference.

Finally, after the normalized weights are calculated, the green color component $G_{13}$ is calculated for block 13 as set forth in Equation 4:

$$G_{13} = B_{13} + \sum_{i=1}^{4} \overline{w}_n ave_n, n = 1, 2, 3, 4, \varepsilon = 1 \tag{7}$$

The other missing green color components for red blocks are similarly calculated based upon the value for red color components, where red intensity values are substituted for the blue intensity values in Equation (7). The other values of missing green color components are calculated for the 5×5 matrix by establishing chrominance groups as described in reference to FIG. 3, where the missing green color component is in the center of another 5×5 matrix.

Once all of the green color components are determined for the original 5×5 matrix, missing red and blue color components of the original 5×5 matrix may then be interpolated, using a technique called the smooth hue transition technique. The smooth hue transition heuristics take advantage of hue or chrominance values typically having lower spatial frequencies than those of luminance values, as well as the human eye being less sensitive to changes in hue than in intensity. Using sample positions introduced in FIG. 3, blue pixel interpolation is performed according to the smooth hue transition technique as set forth in Equations (8):

$$B12=G12/2*(B11/G11+B13/G13)$$

$$B16=G16/2*(B11/G11+B21/G21)$$

$$B17=G17/4*(B11/G11+B13/G13+B21/G21+B23/G23). \quad (8)$$

That is, for each pixel (for which a blue color component is to be interpolated) with two adjacent pixels in a row having a blue color component, such as pixel 7, the B7 color component is interpolated based upon the blue color components in the two adjacent pixels in the row. For each pixel with two adjacent pixels having a blue color component in a column, such as pixel 13, the blue color component is interpolated based upon the blue color components in the two adjacent pixels in the column. For a pixel that does not have any adjacent pixels having known blue color components in the row or column containing the pixel, such as pixel 12, the blue color component is calculated based upon the four blue color components which are diagonal neighbors of the pixel. Similarly, red pixel interpolation is performed according to Equations (9):

$$R8=G8/2*(R7/G7+R9/G9)$$

$$R12=G12/2*(R7/G7+R17/G17)$$

$$R13=G13/4*(R7/G7+R9/G9+R17/G17+R19/G19). \quad (9)$$

The advantage of the smooth hue transition method is an improved suppression of color artifacts. However, the division operations required in the Equations (8) and (9) may introduce outlier specks, and pose a problem in very large scale integration (VLSI) implementations. Also, a digital signal processor (DSP) implementation is hindered by frequent branching due to the handling of the division by 0 exception.

Accordingly, a smooth hue transition with logarithmic domain technique may be used in interpolating red and blue color components. Subtraction is often used in place of division to alleviate the problems stemming from division operations. The advantages of the smooth hue transition with logarithmic domain technique include an improved suppression of color artifacts, reduced number of arithmetic operations, a calculation requiring only additions and subtractions, and the use of only 2 line buffers.

Blue pixel interpolation using a smooth hue transition with logarithmic domain technique is performed according to Equations (10):

$$B12=G12+0.5*(B11-G11+B13-G13)$$

$$B6=G6+0.5*(B11-G11+B21-G21)$$

$$B7=G7+0.5*(B11-G11+B13-G13+B21-G21+B23-G23) \quad (10)$$

Similarly, red pixel interpolation a smooth hue transition with logarithmic domain technique is performed according to Equations (11):

$$R8=G8+0.5*(R7-G7+R9-G9)$$

$$R12=G12+0.5*(R7-G7+R17-G17)$$

$$R13=G13+0.5*(R7-G7+R9-G9+R17-G17+R19-G19) \quad (11)$$

It should be noted that the various equations set forth above would equally apply to a cyan, magenta, yellow representation. Further, the equations would also apply to a four color representation, where the various missing color components would be generated based upon either two vertically adjacent pixels, two horizontally adjacent pixels, or four diagonally adjacent pixels as set forth in the equations above.

Figure 7:
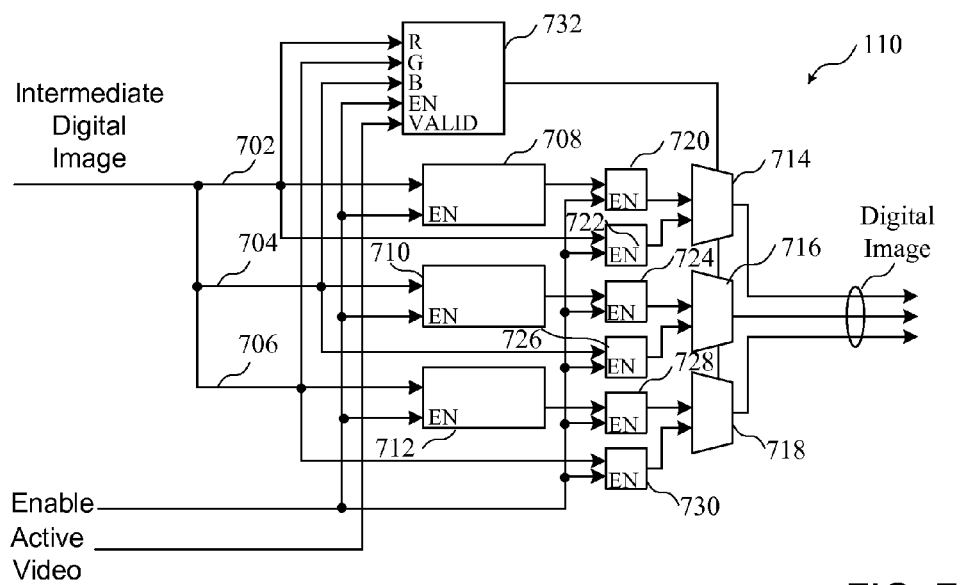
FIG. 7 is a block diagram of a circuit for providing horizontal zipper effect suppression implemented by the horizontal post-processing block of the system of FIG. 1 according to an embodiment of the present invention.

After generating an intermediate digital image having pixels including a color component for each of the color components based upon the calculated weights as shown in FIG. 1, the intermediate digital image is further processed using an additional horizontal processing stage to suppress horizontal zipper effects. As shown in FIG. 7, the horizontal post-processing block 110 receives a red color component 702, a blue color component 704, and a green color component 706 which are coupled to a corresponding low-pass filter. That is, the red color component is coupled to a low-pass filter 708, the blue color component is coupled to a low-pass filter 710, and the green color component is coupled to the low-pass filter 712. Each color component may comprise a serial data stream of intensity values associated with a color for each pixel of an array.

A plurality of registers is coupled to receive the outputs of the various filters. In particular, a register 720 is coupled to receive the output of the low-pass filter 708, while a register 722 is delaying the original red samples, so that the filtered and the non-filtered red samples are in phase. Similarly, a register 724 is coupled to receive the output of the low-pass filter 710, and a register 726 is delaying the original blue samples. Finally, a register 728 is coupled to receive the output of the low-pass filter 712, while a register 730 is delaying the original green samples. A multiplexer network having multiplexers 714-718 is coupled to select, for each pixel, the outputs of the color-pass registers or the outputs of the corresponding low pass filters. Control block 732 evaluates the data and determines whether to select the filtered data or the unfiltered data. Registers in block 732 should be deep enough to store at least one color component for at least 3 pixel values of a row to enable indentifying horizontally zipper effects as set forth below.

The multiplexing network is controlled by a control block 732. Each of the low-pass filters 708-712, the registers 720-730, and the control block 732 are enabled by an enable signal. The control block 732 is also coupled to receive an active video signal indicating that the data coupled to the horizontal post processing block 110 is valid data. The resulting digital image may comprise pixels having both filtered and unfiltered pixel data.

The control block 732 evaluates the intermediate digital image to determine whether there is any horizontal zipper effect which could be eliminated, and controls multiplexers 714-718 to either pass on the original input color components generated at the outputs of filters 702-706 or filtered color components at the outputs of filters 708-712. The control block 732 may be a simplified Nyquist frequency detector block, for example, where the Nyquist frequency refers to the spatial sampling frequency, $f_S$, of the green channel, or luminance channel corresponding to the RGB or CMY inputs. The filters 708-712 may comprise low-pass filters which are designed to suppress the Nyquist frequency but have minimal attenuation below $f_S/2$.

The determination of a zipper effect is a problem associated with luminance. That is, because the zipper effect relates to abrupt changes in intensity between neighboring pixels, the zipper effect is more easily detected by luminance values. Therefore, in order to identify a zipper effect, the original RGB values are converted to luminance (Y) values according to the converter Equation (12):

$$Y=0.299R+0.587G+0.114B. \quad (12)$$

However, in order to reduce the complexity of the hardware required to make the conversion to luminance values, the luminance values are generated instead according to the converter Equation (13):

$$Y=0.25R+0.625G+0.125B, \quad (13)$$

where multipliers required by Equation (12) may be replaced by bit-shift operations, making the RGB-to-Y converter easier to implement in hardware.

RGB-to-Y conversion may be followed by kerning, or quantizing Y down to a programmable number of bits, Y'. Kerning is a truncation process where a programmable number of least significant bits (LSBs) are dropped. By dropping some of the less significant bits, local noise is suppressed to prevent the outputs from frequently switching between the filtered and the original outputs. According to one embodiment of the invention, N–4 bits are used to represent the Y' values, where N is the number of bits in the binary representation of the original sensor data.

The presence of Nyquist frequency, which would indicate a zipper effect condition, is detected by applying Equation (14):

$$sgn(Y'_{k-2}-Y'_{k-1}) \text{XOR } sgn(Y'_{k-1}-Y'_k), \quad (14)$$

where the "sgn" function is a mathematical function that extracts the sign of a real number. The result of Equation (14) indicates whether the intensity has three alternating high and low values. Equation (14) may be implemented by the following pseudo-code:

If $((Y_{t-2}<=Y_{t-1})$ and $(Y_{t-1}<=Y_t))$ or $((Y_{t-2}>=Y_{t-1})$ and $(Y_{t-1}>=Y_t))$ then $Ro_t=Ri_t$ $Go_t=Gi_t$ $Bo_t=Bi_t$ else $Ro_t=Rf_t$ $Go_t=Gf_t$ $Bo_t=Bf_t$, where $Ri_t$, $Gi_t$, $Bi_t$ are the input signals, and $Ro_t$, $Go_t$, $Bo_t$ are the current red, green and blue outputs at a time t. According to the pseudo-code, if the luminance values are continuously increasing or equal or continuously decreasing or equal for any three consecutive pixels, no zipper effect is detected in those pixels. Otherwise, alternating high and low values are detected in 3 consecutive pixels, and the filtered values are selected to eliminate the zipper effect.

The filtered values output by the low-pass filters 708-712 may be calculated according to Equation (15):

$$Rf_{t-1}=0.25*Ri_{t-2}+0.5*Ri_{t-1}+0.25*Ri_t$$

$$Gf_{t-1}=0.25*Gi_{t-2}+0.5*Gi_{t-1}+0.25*Gi_t$$

$$Bf_{t-1}=0.25*Bi_{t-2}+0.5*Bi_{t-1}+0.25*Bi_t \quad (15)$$

Because the horizontal post-processing stage only performs horizontal processing, no line buffers are necessary. That is, because the data associated with the image is processed based upon rows of the matrix, the data is already required to be stored in memory buffers, and no additional memory buffers are needed. Because the low-pass filters may be implemented using coefficients (0.25, 0.5, 0.25) as set forth above in Equation (15), the circuit of FIG. 7 may be implemented without multipliers. Accordingly, the implementation of the horizontal post-processing makes the circuits and methods of the present invention cost effective, and particularly in devices which may have limited circuit resources, such as programmable logic devices.

Figure 8:
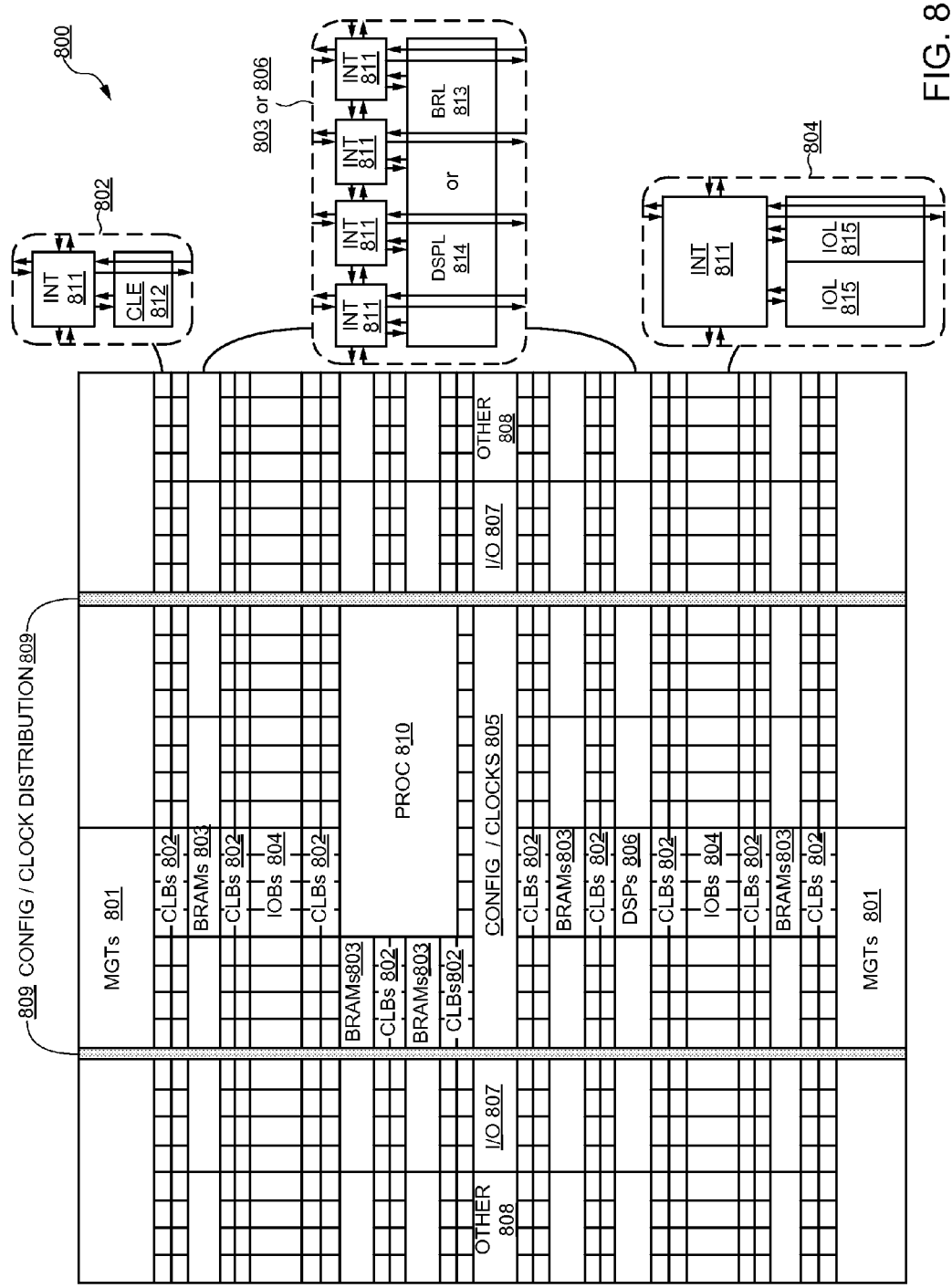
FIG. 8 is a block diagram of a circuit having programmable elements according to an embodiment of the present invention.

Turning now to FIG. 8, a block diagram of a circuit having programmable elements according to an embodiment of the present invention is shown. The circuits and methods of the present invention as described above with respect to FIGS. 1-7 may be implemented in the circuit of FIG. 8. While devices having programmable logic may be implemented in any type of integrated circuit device, such as an application specific integrated circuit (ASIC) having programmable logic, other devices comprise dedicated programmable logic blocks. A programmable logic device (PLD) is an integrated circuit device designed to be user-programmable so that users may implement logic designs of their choices. One type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both of these types of programmable logic devices, the functionality of the device is controlled by configuration data bits of a configuration bitstream provided to the device for that purpose. The configuration bitstream comprises information related to the placement of blocks, and therefore comprises a placement configuration for the circuit implemented in a particular device. The configuration data bits may be stored in volatile memory (e.g., static memory cells, as in FPGAs and some CPLDs), in non-volatile memory (e.g., flash memory, as in some CPLDs), or in any other type of memory cell.

The device of FIG. 8 comprises an FPGA architecture 800 having a large number of different programmable tiles including multi-gigabit transceivers (MGTs) 801, CLBs 802, random access memory blocks (BRAMs) 803, input/output blocks (IOBs) 804, configuration and clocking logic (CONFIG/CLOCKS) 805, digital signal processing blocks (DSPs) 806, specialized input/output blocks (I/O) 807 (e.g., configuration ports and clock ports), and other programmable logic 808 such as digital clock managers, analog-to-digital converters, system monitoring logic, and so forth. Some FPGAs also include dedicated processor blocks (PROC) 810.

In some FPGAs, each programmable tile includes a programmable interconnect element (INT) 811 having standardized connections to and from a corresponding interconnect element in each adjacent tile. Therefore, the programmable interconnect elements taken together implement the programmable interconnect structure for the illustrated FPGA. The programmable interconnect element 811 also includes the connections to and from the programmable logic element within the same tile, as shown by the examples included at the top of FIG. 8.

For example, a CLB 802 may include a configurable logic element (CLE) 812 that may be programmed to implement user logic plus a single programmable interconnect element

811. A BRAM 803 may include a BRAM logic element (BRL) 813 in addition to one or more programmable interconnect elements. The BRAM comprises dedicated memory separate from the distributed RAM of a configuration logic block. Typically, the number of interconnect elements included in a tile depends on the height of the tile. In the pictured embodiment, a BRAM tile has the same height as four CLBs, but other numbers (e.g., five) may also be used. A DSP tile 806 may include a DSP logic element (DSPL) 814 in addition to an appropriate number of programmable interconnect elements. An IOB 804 may include, for example, two instances of an input/output logic element (IOL) 815 in addition to one instance of the programmable interconnect element 811. The location of connections of the device is controlled by configuration data bits of a configuration bitstream provided to the device for that purpose. The programmable interconnects, in response to bits of a configuration bitstream, enable connections having interconnect lines to be used to couple the various signals to the circuits implemented in programmable logic, or other circuits such as BRAMs or the processor.

In the pictured embodiment, a columnar area near the center of the die is used for configuration, clock, and other control logic. Vertical areas 809 extending from this column are used to distribute the clocks and configuration signals across the breadth of the FPGA. Some FPGAs utilizing the architecture illustrated in FIG. 8 include additional logic blocks that disrupt the regular columnar structure making up a large part of the FPGA. The additional logic blocks may be programmable blocks and/or dedicated logic. For example, the processor block PROC 810 shown in FIG. 8 spans several columns of CLBs and BRAMs.

Note that FIG. 8 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 8 are purely exemplary. For example, in an actual FPGA more than one adjacent column of CLBs is typically included wherever the CLBs appear, to facilitate the efficient implementation of user logic.

Figure 9:
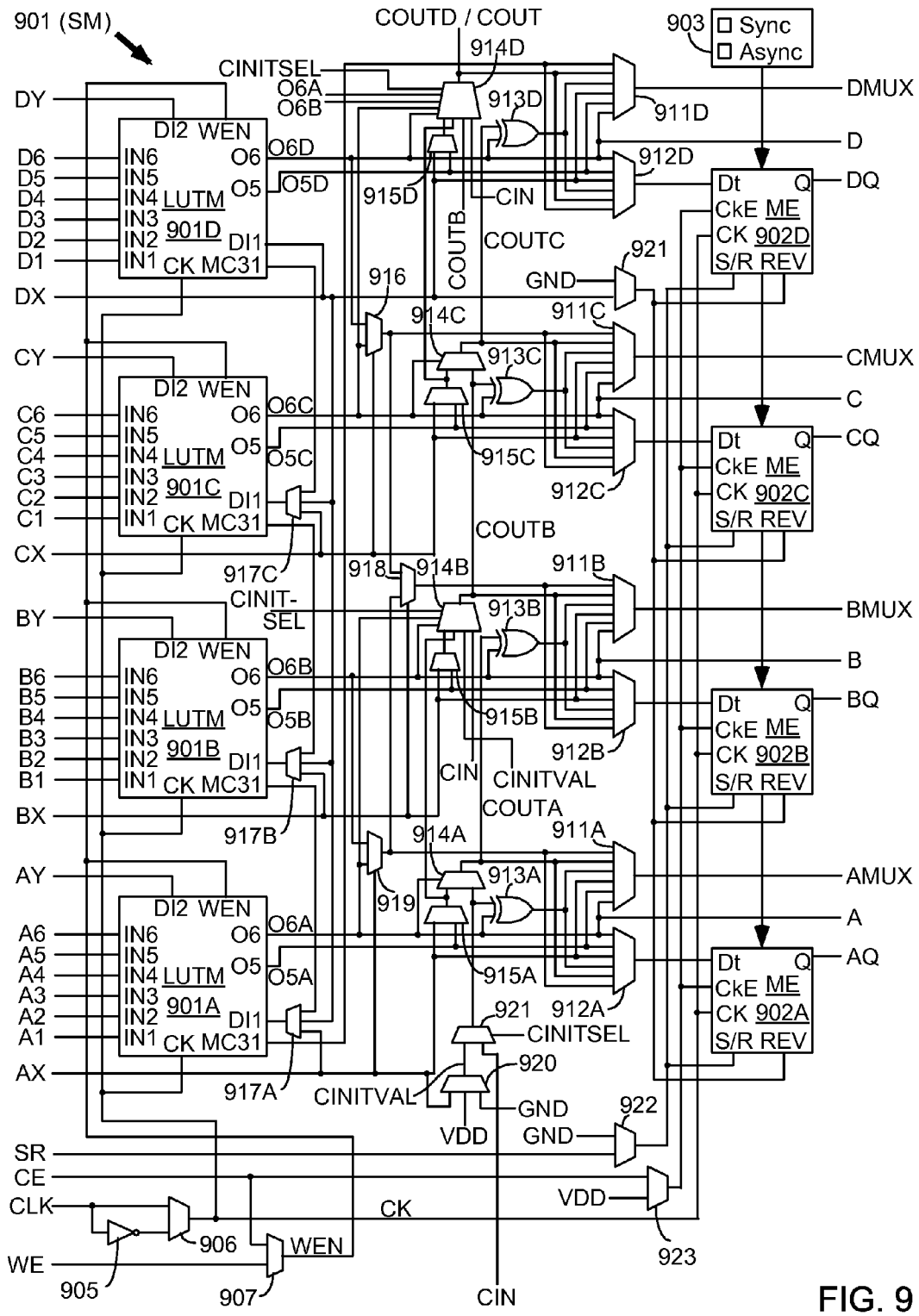
FIG. 9 is a block diagram of a configurable logic element of the circuit of FIG. 8 according to an embodiment of the present invention.

Turning now to FIG. 9, a configurable logic element of the circuit of FIG. 8 according to an embodiment of the present invention is shown. In particular, FIG. 9 illustrates in simplified form a configurable logic element of a configuration logic block 802 of FIG. 8. In the embodiment of FIG. 9, slice M 901 includes four lookup tables (LUTMs) 901A-901D, each driven by six LUT data input terminals A1-A6, B1-B6, C1-C6, and D1-D6 and each providing two LUT output signals O5 and O6. The O6 output terminals from LUTs 901A-901D drive slice output terminals A-D, respectively. The LUT data input signals are supplied by the FPGA interconnect structure via input multiplexers, which may be implemented by programmable interconnect element 811, and the LUT output signals are also supplied to the interconnect structure. Slice M also includes: output select multiplexers 911A-911D driving output terminals AMUX-DMUX; multiplexers 912A-912D driving the data input terminals of memory elements 902A-902D; combinational multiplexers 916, 918, and 919; bounce multiplexer circuits 922-923; a circuit represented by inverter 905 and multiplexer 906 (which together provide an optional inversion on the input clock path); and carry logic having multiplexers 914A-914D, 915A-915D, 920-921 and exclusive OR gates 913A-913D. All of these elements are coupled together as shown in FIG. 9. Where select inputs are not shown for the multiplexers illustrated in FIG. 9, the select inputs are controlled by configuration memory cells. That is, configuration bits of the configuration bitstream stored in configuration memory cells are coupled to the select inputs of the multiplexers to select the correct inputs to the multiplexers. These configuration memory cells, which are well known, are omitted from FIG. 9 for clarity, as well as from other selected figures herein.

In the pictured embodiment, each memory element 902A-902D may be programmed to function as a synchronous or asynchronous flip-flop or latch. The selection between synchronous and asynchronous functionality is made for all four memory elements in a slice by programming Sync/Asynch selection circuit 903. When a memory element is programmed so that the S/R (set/reset) input signal provides a set function, the REV input terminal provides the reset function. When the memory element is programmed so that the S/R input signal provides a reset function, the REV input terminal provides the set function. Memory elements 902A-902D are clocked by a clock signal CK, which may be provided by a global clock network or by the interconnect structure, for example. Such programmable memory elements are well known in the art of FPGA design. Each memory element 902A-902D provides a registered output signal AQ-DQ to the interconnect structure. Because each LUT 901A-901D provides two output signals, O5 and O6, the LUT may be configured to function as two 5-input LUTs with five shared input signals (IN1-IN5), or as one 6-input LUT having input signals IN1-IN6.

In the embodiment of FIG. 9, each LUTM 901A-901D may function in any of several modes. When in lookup table mode, each LUT has six data input signals IN1-IN6 that are supplied by the FPGA interconnect structure via input multiplexers. One of 64 data values is programmably selected from configuration memory cells based on the values of signals IN1-IN6. When in RAM mode, each LUT functions as a single 64-bit RAM or two 32-bit RAMs with shared addressing. The RAM write data is supplied to the 64-bit RAM via input terminal DI1 (via multiplexers 917A-917C for LUTs 901A-901C), or to the two 32-bit RAMs via input terminals DI1 and DI2. RAM write operations in the LUT RAMs are controlled by clock signal CK from multiplexer 906 and by write enable signal WEN from multiplexer 907, which may selectively pass either the clock enable signal CE or the write enable signal WE. In shift register mode, each LUT functions as two 16-bit shift registers, or with the two 16-bit shift registers coupled in series to create a single 32-bit shift register. The shift-in signals are provided via one or both of input terminals DI1 and DI2. The 16-bit and 32-bit shift out signals may be provided through the LUT output terminals, and the 32-bit shift out signal may also be provided more directly via LUT output terminal MC31. The 32-bit shift out signal MC31 of LUT 901A may also be provided to the general interconnect structure for shift register chaining, via output select multiplexer 911D and CLE output terminal DMUX. By way of example, the two-input normalization circuits of FIGS. 4 and 6 and the circuit for providing horizontal zipper effect suppression of FIG. 7 may be implemented in CLBs and BRAMs of the circuit of FIG. 8. Other aspects of the weight calculation and image generation may be implemented by software running on the processor 810 of FIG. 8. Accordingly, the methods of the present invention may be implemented in a signal processing device such as the FPGA of FIGS. 8 and 9, or any other suitable signal processing device.

Figure 10:
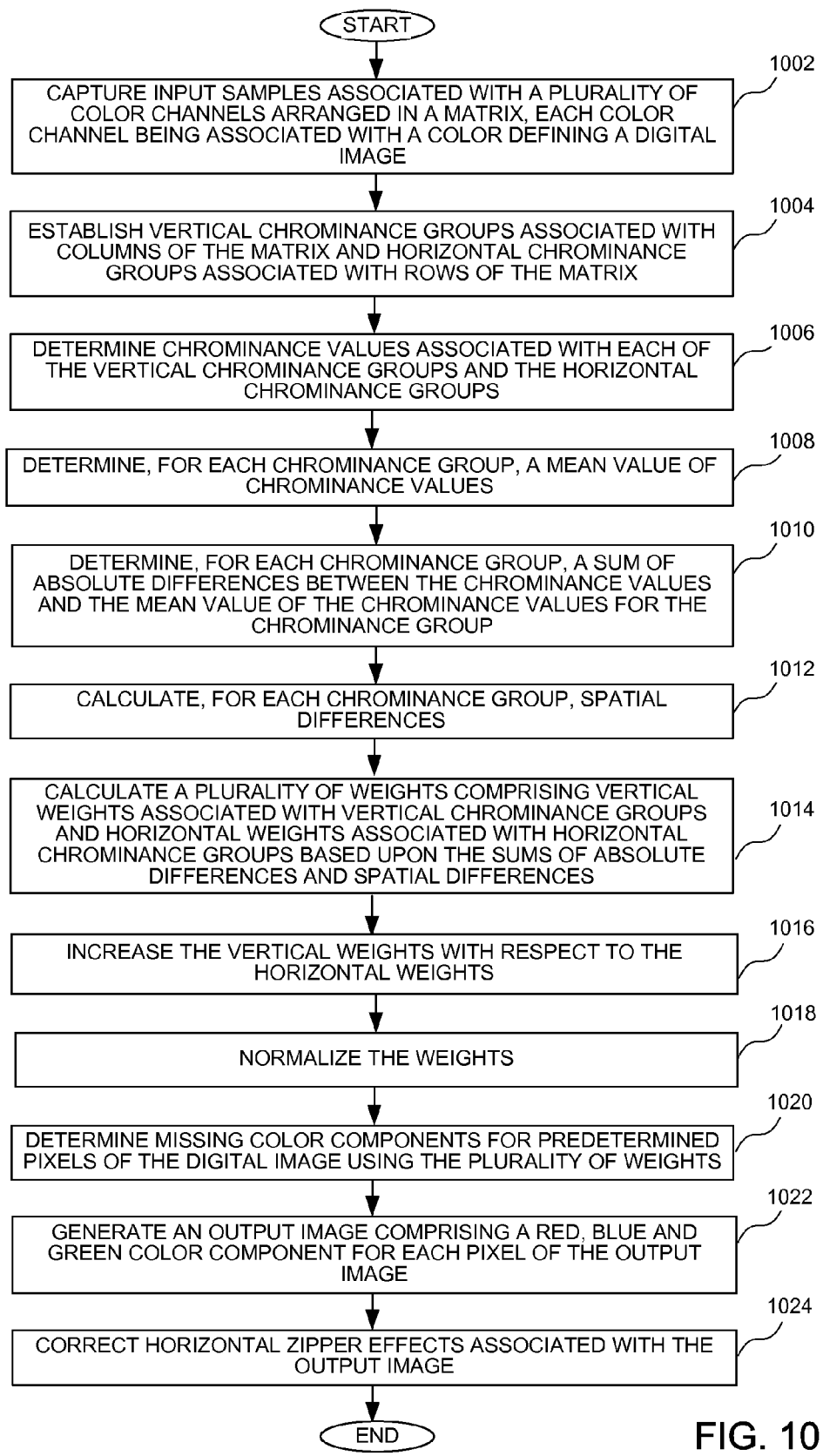
FIG. 10 is a flow chart showing a method of reducing aberrations in a digital image according to an embodiment of the present invention.

Turning now to FIG. 10, a flow chart shows a method of interpolating missing color components and reducing aberrations in a digital image according to an embodiment of the present invention. The methods of FIGS. 10 and 11 may be implemented using any of the embodiments of the invention of FIGS. 1-9 as described, or any other suitable circuits. Input samples associated with a plurality of color channels arranged in a matrix are captured at a step 1002, where each color channel is associated with a single color component of a plurality of color components defining the digital image. Vertical chrominance groups associated with columns of the matrix and horizontal chrominance groups associated with rows of the matrix are established at a step 1004. Chrominance values associated with each of the vertical chrominance groups and the horizontal chrominance groups are determined at a step 1006.

For each chrominance group, a mean value of chrominance values is determined at a step 1008. For each chrominance group, a sum of absolute differences between the chrominance values and the mean value of the chrominance values for the chrominance group is determined at a step 1010. Spatial differences for each chrominance group are also calculated at a step 1012.

A plurality of weights including vertical weights associated with vertical chrominance groups and horizontal weights associated with horizontal chrominance groups are calculated based upon the sums of absolute differences and the spatial differences at a step 1014. The vertical weights are increased with respect to the horizontal weights at a step 1016. The weights are then normalized at a step 1018. Missing color components for predetermined pixels of the digital image are determined using the normalized weights at a step 1020. For example, missing green color components may be determined for each pixel which does not have a green component. Blue or red color components are then determined for each of the pixels based upon the green color components of the pixels and corresponding blue or red color components in adjacent pixels, as set forth above. An output image having a red, blue and green color component for each pixel of the output image is generated at a step 1022. Horizontal zipper effects associated with the output image are then corrected at a step 1024.

Figure 11:
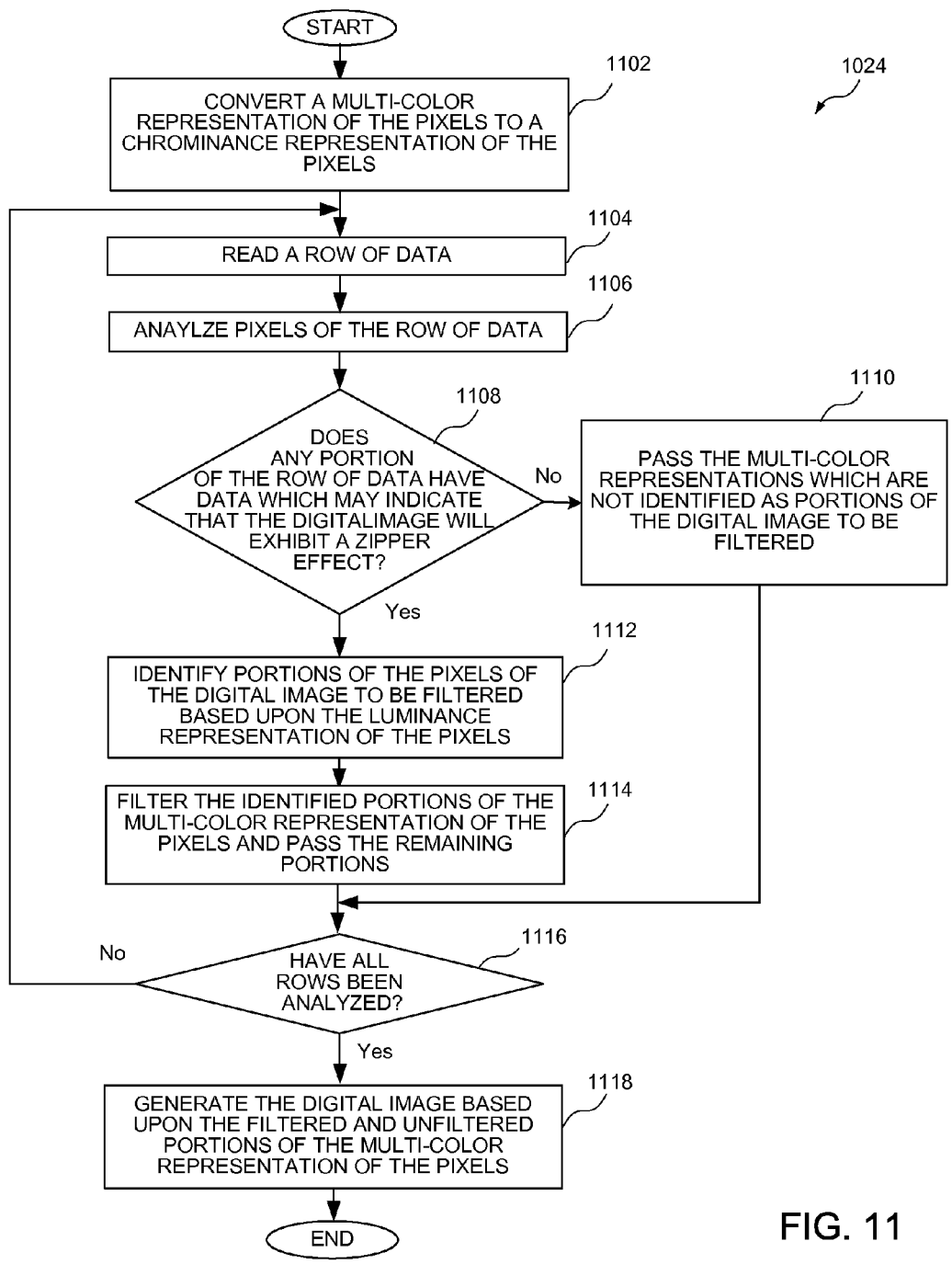
FIG. 11 is a flow chart showing a method for correcting horizontal zipper effects in a post-processing stage according to an embodiment of the present invention.

Turning now to FIG. 11, a flow chart shows a method for correcting horizontal zipper effects of the step 1022 of FIG. 10 in a post-processing stage according to an embodiment of the present invention. The method of FIG. 11 may be implemented by the circuit of FIG. 7 as described above. The multi-color representation of the pixels in the matrix is converted to a chrominance representation of the pixels at a step 1102. A row of data is read at a step 1104, and pixels of a row of data are analyzed at a step 1106. It is then determined whether any portion of the row of data has data which may indicate that the digital image will exhibit a zipper effect at a step 1108. If no portion of the row has data which may indicate that the digital image will exhibit a zipper effect, the data associated with each pixel of the row is not filtered, but rather passed, at a step 1110. Otherwise, portions of the pixels of the row are identified to be filtered based upon the luminance representation of the pixels at a step 1112. The identified portions of the pixels are then filtered and the remaining portions are passed at a step 1114. It is then determined whether all rows have been analyzed at a step 1116. If not, another row of data is analyzed at the step 1104. Once all of the rows of data have been analyzed, the digital image is generated based upon the filtered and unfiltered portions of the multi-color representation of the pixels at a step 1118.

One benefit of the circuits and methods of the present invention is that they produce high quality results without using an external frame buffer, and therefore enable a low-cost, small-footprint implementation of a circuit to reduce aberrations in a digital image. The circuits and methods may save BRAM and dedicated multiplier resources of DSPs in an FPGA, where usually these resources are less abundant than slice-based logic, as shown in FIG. 8. The circuits and methods set forth above may also lead to efficient and compact packing. For example, because the weighed sum operation uses multiplexers, an implementation of the circuit using slices having multiplexers for the post processing may help balance the slice and dedicated multiplier allocations.

It can therefore be appreciated that the new and novel circuits for and methods of reducing aberrations in a digital image have been described. It will be appreciated by those skilled in the art that numerous alternatives and equivalents will be seen to exist that incorporate the disclosed invention. As a result, the invention is not to be limited by the foregoing embodiments, but only by the following claims.

What is claimed is:

1. A method of reducing aberrations in a digital image, the method comprising:
   capturing input samples associated with a plurality of pixels arranged in a matrix, where each pixel is associated with a color component of a plurality of color components defining the digital image;
   establishing vertical chrominance groups associated with columns of the matrix, each vertical chrominance group having a plurality of groups of pixels aligned in a vertical direction;
   establishing horizontal chrominance groups associated with rows of the matrix, each horizontal chrominance group having a plurality of groups of pixels aligned in a horizontal direction;
   determining, for each chrominance group of the vertical and horizontal chrominance groups, a chrominance value for each group of pixels of the plurality of groups of pixels;
   determining, for each chrominance group of the vertical and horizontal chrominance groups, a mean value for the chrominance values associated with the chrominance group;
   determining, for each chrominance group of the vertical and horizontal chrominance groups, a sum of absolute differences between the chrominance values and the mean value for the chrominance values associated with the chrominance group;
   calculating, by a signal processing device, a plurality of weights comprising vertical weights associated with the vertical chrominance groups and horizontal weights associated with the horizontal chrominance groups based upon the sums of absolute differences; and
   determining a missing color component for a predetermined pixel of the plurality of pixels using the plurality of weights.

2. The method of claim 1, wherein:
   the capturing input samples comprises capturing input samples having every other pixel of each row of the matrix represented by a first color component; and
   the establishing vertical and horizontal chrominance groups comprises determining a magnitude difference of values of color components between a pixel represented by the first color component and a pixel represented by a second color component or between a pixel represented by the first color component and a pixel represented by a third color component.

3. The method of claim 1, wherein the determining a missing color component for a predetermined pixel comprises determining a first color component for the predetermined pixel.

4. The method of claim 3, further comprising:
- determining the missing first color component for each pixel of the plurality of pixels not having a first color component; and
- determining a missing second color component or a missing third color component for each pixel of the plurality of pixels.

5. The method of claim 4, further comprising generating the digital image comprising the first, second and third color components for each pixel of the plurality of pixels and correcting horizontal zipper effects associated with the digital image.

6. The method of claim 1, further comprising calculating spatial differences for each of the vertical and horizontal chrominance groups, wherein the plurality of weights is calculated based upon spatial differences.

7. The method of claim 1, further comprising increasing the vertical weights with respect to the horizontal weights.

8. A method of reducing aberrations in a digital image, the method comprising:
- capturing input samples associated with a plurality of pixels arranged in a matrix, wherein each pixel is associated with a color component of a plurality of color components defining the digital image;
- establishing vertical chrominance groups associated with columns of the matrix, each vertical chrominance group having a plurality of groups of pixels aligned in a vertical direction;
- establishing horizontal chrominance groups associated with rows of the matrix, each horizontal chrominance group having a plurality of groups of pixels aligned in a horizontal direction;
- determining, for each chrominance group of the vertical and horizontal chrominance groups, a mean value for chrominance values associated with the plurality of groups of pixels;
- calculating, by a signal processing device, a plurality of weights comprising vertical weights associated with the vertical chrominance groups based upon the mean values for the vertical chrominance groups and horizontal weights associated with the horizontal chrominance groups based upon the mean values for the horizontal chrominance groups;
- increasing the vertical weights with respect to the horizontal weights; and
- determining a missing color component for a predetermined pixel of the plurality of pixels using the horizontal weights and the increased vertical weights.

9. The method of claim 8, wherein the increasing the vertical weights with respect to the horizontal weights comprises multiplying each weight of the vertical weights by a predetermined factor.

10. The method of claim 8, further comprising:
- determining, for each of the vertical and horizontal chrominance groups, a sum of absolute differences between the chrominance values and the mean value for the chrominance values of the chrominance group,
- wherein the calculating a plurality of weights comprises calculating a plurality of weights based upon the sums of absolute differences.

11. The method of claim 10, further comprising:
- determining, for each of the vertical and horizontal chrominance groups, spatial differences,
- wherein the calculating a plurality of weights comprises calculating a plurality of weights based upon the spatial differences.

12. The method of claim 8, wherein:
- the capturing input samples comprises capturing a matrix of input samples having every other pixel of the matrix represented by a first color component, and
- the establishing chrominance groups comprises determining a magnitude difference of values of color components between a pixel represented by the first color component and a pixel represented by a second color component or between a pixel represented by the first color component and a pixel represented by a third color component.

13. The method of claim 8, wherein the determining a missing color component for a predetermined pixel comprises determining a first color component.

14. The method of claim 13, further comprising:
- determining a missing first component for each pixel of the plurality of pixels not having the first color component;
- determining a second color component for each pixel of the plurality of pixels not having the second color component; and
- determining a third color component for each pixel of the plurality of pixels not having the third color component.

* * * * *